United States Patent
Schwägerl et al.

(10) Patent No.: US 10,086,444 B2
(45) Date of Patent: Oct. 2, 2018

(54) DRILL TIP AND DRILLING TOOL HAVING A DRILL TIP

(75) Inventors: Jürgen Schwägerl, Vohenstrauβ (DE); Herbert Rudolf Kauper, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 908 days.

(21) Appl. No.: 13/255,752

(22) PCT Filed: Feb. 12, 2010

(86) PCT No.: PCT/EP2010/000877
§ 371 (c)(1),
(2), (4) Date: Sep. 9, 2011

(87) PCT Pub. No.: WO2010/102705
PCT Pub. Date: Sep. 16, 2010

(65) Prior Publication Data
US 2011/0318128 A1    Dec. 29, 2011

(30) Foreign Application Priority Data

Mar. 11, 2009 (DE) .................. 10 2009 012 725

(51) Int. Cl.
*B23B 51/02* (2006.01)

(52) U.S. Cl.
CPC .......... *B23B 51/02* (2013.01); *B23B 2251/02* (2013.01); *B23B 2251/046* (2013.01);
(Continued)

(58) Field of Classification Search
CPC ..... B23B 51/02; B23B 51/06; B23B 2251/02; B23B 2251/282; B23B 2251/44; B23B 2251/446; B23B 2251/443
(Continued)

(56) References Cited

U.S. PATENT DOCUMENTS 1,221,247 A * 4/1917 Traylor .................. 408/224
2,396,335 A   3/1946 Moller
(Continued)

FOREIGN PATENT DOCUMENTS

CN    1526500 A      9/2004
DE    26 55 452 A1   6/1978
(Continued)

OTHER PUBLICATIONS

European Patent Office, "International Search Report", English and German Language versions, dated Apr. 12, 2010, 6 pp. total.
(Continued)

*Primary Examiner* — Sunil K Singh
*Assistant Examiner* — Alan Snyder
(74) *Attorney, Agent, or Firm* — Ian K. Samways

(57) ABSTRACT

The invention relates to a drill tip (2) comprising a base body (6) having chip flutes (22A,B) and extending in the axial direction along an axis of rotation (8) and having at least two main cutting edges (14A,B) on the front face thereof extending outward in the radial direction to a cutting corner (16A,B). Seen in cross section, the base body is asymmetric relative to rotation about the axis of rotation (8) at the height of the cutting corner (16A,B). The cross section of the base body is simultaneously designed having symmetrical spacing from the main cutting edges (14A,B). The drill tip (2) is in particular designed as an interchangeable modular part of a modularly designed drill tip (5). A drill base body (4) in which the drill tip (2) can be inserted can therefore in turn be designed symmetrically.

16 Claims, 3 Drawing Sheets

(52) U.S. Cl.
CPC ..... *B23B 2251/282* (2013.01); *B23B 2251/40* (2013.01); *B23B 2251/408* (2013.01); *B23B 2251/446* (2013.01); *B23B 2251/50* (2013.01); *B23B 2251/70* (2013.01); *Y10T 408/892* (2015.01); *Y10T 408/9095* (2015.01)

(58) Field of Classification Search
USPC ................ 408/226, 227, 230, 231, 232, 713
See application file for complete search history.

(56) References Cited

U.S. PATENT DOCUMENTS

| | | | | |
|---|---|---|---|---|
| 4,963,059 | A | * | 10/1990 | Hiyama ........................ 407/60 |
| 5,947,659 | A | * | 9/1999 | Mays ............................ 408/211 |
| 2004/0175245 | A1 | | 9/2004 | Takiguchi |
| 2005/0084352 | A1 | * | 4/2005 | Borschert et al. ............ 408/226 |
| 2005/0249562 | A1 | * | 11/2005 | Frejd ............................ 408/230 |
| 2009/0110501 | A1 | | 4/2009 | Drori et al. |
| 2010/0260567 | A1 | * | 10/2010 | Kauper ........................ 408/227 |

FOREIGN PATENT DOCUMENTS

| | | |
|---|---|---|
| DE | 10 2006 025 294 A1 | 12/2007 |
| DE | 102008045326 | 12/2010 |
| EP | 1 837 128 A2 | 9/2008 |
| EP | 1 992 437 A1 | 11/2008 |
| JP | 2004-276134 A | 10/2004 |
| JP | WO2007/097474 A1 | 8/2007 |
| WO | 9704908 A1 | 2/1997 |
| WO | 03070408 A1 | 8/2003 |

OTHER PUBLICATIONS

Final Rejection dated Jun. 17, 2014.
Mar. 2, 2017 Second Office Action K-02742-DE-NP.

* cited by examiner

DRILL TIP AND DRILLING TOOL HAVING A DRILL TIP

BACKGROUND OF THE INVENTION

The invention relates to a drill tip according to the preamble of Claim 1, and to a drilling tool having such a drill tip.

A drill tip according to the preamble of Claim 1 is disclosed, for example, by DE 10 2006 025 294 A1. Described therein is a drilling tool of a special asymmetrical configuration. The drill tip of this drilling tool has two main cutting edges, which—unlike a symmetrical configuration—are disposed in a non-rotationally symmetrical manner relative to a 180° rotation about the axis of rotation of the drilling tool. The main cutting edges extend as far as a cutting corner adjoined in each case by a secondary cutting edge, which runs along a chip flute. At the periphery, on the so-called drill heel, a guide land adjoins the respective secondary cutting edge. In addition, it is provided that an additional support land for only one of the two chisel edges is realized on the drill heel. By means of the support land, the drilling tool is supported on the wall of the drilled hole.

By means of this asymmetrical configuration of the drill, untrue running of the drill, namely so-called "chatter", is prevented, or at least reduced. This is because, in the case of symmetrical drills, vibrations of the drilling tool increase during the drilling operation because of the symmetry and, as it were, "build up", such that, because of the vibrating of the drilling tool, irregularities, also termed "chatter marks", are produced in the wall of the drilled hole. This problem increases as the length of the drill hole increases.

Overall, owing to the asymmetrical configuration, the chatter is at least reduced. In respect of manufacturing engineering, however, the asymmetrical configuration is more demanding of production resources, compared with a symmetrical configuration.

Object of the Invention

The invention is based on the object of rendering possible a drilling tool that is easy to manufacture and with which chatter is prevented as much as possible.

Achievement of the Object

The object is achieved, according to the invention, by a drill tip having the features of Claim 1, and by a drilling tool having such a drill tip.

The drill tip comprises a basic body provided with chip flutes and extending in the axial direction along an axis of rotation. The basic body has a front outside end, on which at least two main cutting edges are provided. The latter run outwards in the radial direction to a cutting corner. In order to prevent chatter as much as possible, the drill tip is realized asymmetrically in the cutting-edge region and consequently, in particular, also in a cross-section at the level of the cutting corners. At the same time, it is provided that this asymmetrical configuration undergoes a transition in the axial direction into a symmetrical configuration, and preferably also remains symmetrical for the remaining axial length of the drilling tool.

In this case, asymmetrical configuration relative to the rotation about the axis of rotation means that the drill tip deviates from a rotational symmetry. In the case of two main cutting edges, therefore, the drill tip deviates from a 180° rotational symmetry and, in the case of a configuration with three main cutting edges, from a 120° rotational symmetry, etc. The drill tip in this case can be realized asymmetrically in respect of a plurality of asymmetry features. Preferably, but not necessarily, all asymmetry features undergo a transition into a symmetrical configuration. The transition to the symmetrical configuration therefore relates, in general, at least to one asymmetry feature.

The main cutting edges of the drill tip are usually joined to one another via a so-called chisel edge, which realizes the foremost tip of the drill tip on the axis of rotation. The main cutting edges in this case extend outwards in the radial direction. Outwards in the radial direction means, in general, that the main cutting edges extend out from the drill center, or the chisel edge, to the outer periphery of the basic body. Usually, the main cutting edges do not run along a straight line, but, rather, are realized in a curved manner. Adjoining the main cutting edges in each case is a main flank, which undergoes a transition into a chip flute. The main flanks are usually realized in the manner of conical surfaces, and the drill tip as a whole in the manner of a cone.

The particular advantage of the special configuration with the transition from the outside-end asymmetry to the symmetrical configuration at a distance from the outside end in the axial direction consists in that the asymmetry is limited only to a region of the drilling tool as a whole that is as short as possible, i.e., adjoining the asymmetrical region, the drilling tool is realized symmetrically. As a result, it is only in the region of the drill tip that it is necessary to produce an asymmetry that deviates from the symmetrical realization. For the rest of the drill body, therefore, usual symmetrical machining methods can be used for manufacture of the drilling tool. The symmetry in the axially backward region also ensures an even chip discharge. This is particularly advantageous in the case of long drilled holes. Finally, the making of cooling channels, for example, is less demanding than in the case of an asymmetrical configuration, since, in the case of a symmetrical configuration, the tolerance distance of the cooling channels made in the drilling body in relation to the respective chip flutes is identical for all cooling channels.

Additionally, a crucial advantage is obtained in the case of so-called modular drilling tools, in which the drill tip can be inserted, in particular as an exchangeable modular part, in a drill basic body, at an outside end. In the case of such a modular drilling tool, therefore, both symmetrical and asymmetrically configured drill tips can now be used equally on a standard drill basic body—depending on the requirement profile—in the manner of a modular construction principle.

Such drilling tools are used in industrial production to produce high-precision drill holes. For this purpose, they are clamped by a shank into a receiver of a machine tool, which can be programmed, for example, in respect of the desired rotational speed and the desired feed, and which executes the drilling operation automatically.

Different asymmetry features can be provided to realize the asymmetry. A preferred asymmetry feature consists in that the angular distance of a cutting corner, or of a main cutting edge in the case of a defined radial distance in relation to the axis of rotation, in relation to the cutting corner leading in the direction of rotation, or to the leading main cutting edge, differs from the angular distance in relation to the following cutting corner, or to the following cutting edge, i.e. the cutting corners are not disposed with a uniform distribution around the periphery. Expediently, in addition, it is provided that the secondary cutting edges adjoining the cutting corners—after a transition region—are disposed with a uniform distribution around the periphery, and therefore in a rotationally symmetrical manner. After a defined axial distance from the cutting corners, therefore, adjacent secondary cutting edges have the same angular distance from one another in each case.

For the purpose of configuring the asymmetry in the outside-end region of the drill tip, it is provided, according to an expedient development, that the secondary cutting edges have different inclinations in the transition region from the symmetrical to the asymmetrical configuration. Consequently, because of these different inclinations, the angular distance of the secondary cutting edges in relation to one another varies. The inclination of the secondary cutting edge in this case means the angle included by the secondary cutting edge in relation to a straight line extending in the axial direction and lying on the peripheral line of the drilling tool. Since the secondary cutting edge at the same time constitutes the—relative to the direction of rotation—back edge of a chip flute, a helix angle of the chip flutes is at the same time determined by means of the secondary cutting edge. Consequently, the helix angle of the chip flutes thus also varies in the transition region. Expediently, it is provided in this case that, starting from the asymmetrical region, only one secondary cutting edge has an inclination that differs from that in the asymmetrical region, whereas the other secondary cutting edge is continued with the same inclination as in the symmetrical region.

Preferably, the chip flutes, at the level of the cutting corners, also have an asymmetrical configuration that then undergoes a transition in the axial direction into a symmetrical configuration. This is especially advantageous, in particular in the case of modular drilling tools, since it is thereby ensured that the chip flutes of the exchangeable drill tip part undergo a transition, in particular, in a flush manner into the chip flutes of the drill basic body, i.e. that no disturbing edges, etc. are realized.

According to a preferred configuration, it is furthermore provided that the chip flutes also have equal cross-sectional areas in the asymmetrical region, i.e. that the space available for carrying away the chips is at least substantially the same in both chip flutes. Owing to the asymmetry of the cross-sectional areas in the asymmetrical region, therefore, a greater width of the one chip flute, for example, is compensated by a lesser depth.

According to a preferred development, the main flanks adjoining the respective main cutting edge are realized symmetrically in relation to one another, at their back end, insofar as the back ends of the main flanks have the same angular distance in relation to one another, i.e. are disposed with a uniform distribution. The back end in this case means the end of the main flank that faces away from the assigned main cutting edge, and at which the main flank undergoes a transition into an assigned chip flute. Preferably, therefore, only the cutting corners, or the main cutting edges, are disposed with non-uniform distribution. As a result, particularly in the case of the drill tip being configured as an exchangeable modular part, the receiver for fastening the drill tip can be realized symmetrically.

Expediently, it is provided that the asymmetrical configuration undergoes a transition uniformly and, in particular, evenly, namely without kinks and edges, into the symmetrical configuration. This even course ensures, in particular, reliable chip discharge. At the same time, in respect of production engineering, this can be realized comparatively easily.

Expediently, the drill tip is realized as an exchangeable modular part provided for insertion in a drill basic body of a modular drilling tool. In particular, it is provided in this case that the symmetrical configuration is achieved at the axially rear end of the exchangeable modular part, in particular at its rear outside face. It is thereby ensured that the drill tip realized asymmetrically at the front outside end can be inserted in a symmetrically realized drill basic body.

In the case of an exchangeable tip part, the axial length of the transition region, in which the symmetrical configuration undergoes a transition into the asymmetrical configuration, is preferably less than or equal to a functional axial length of the exchangeable drill tip part. Functional axial length in this case means, in particular, the length up to which the functional surfaces of the chip flute of the drill tip that are effective for chip discharge undergo a transition into the assigned surfaces of the chip flutes of the drill basic body, or the length at which the secondary cutting edges of the drill tip undergo a transition into the assigned secondary cutting edges of the drill basic body. The actual axial extent of the drill tip can exceed this functional axial length, for example because of fastening pins, etc.

If solid drills, for example solid hard-metal drills, are used instead of modular drilling tools, the axial length of the transition region is preferably 0.5 to 5 times the nominal diameter of the solid tool.

In the case of exchangeable drill tips being used, the axial length of the transition region is usually approximately 0.5 to 1 times the nominal diameter of the drilling tool.

An exemplary embodiment of the invention is explained more fully in the following text with reference to the figures.

DESCRIPTION OF THE FIGURES

In exemplary representations in each case.

DESCRIPTION OF THE EXEMPLARY EMBODIMENT

In the figures, parts that have the same function are denoted by the same references.

Figure 1:
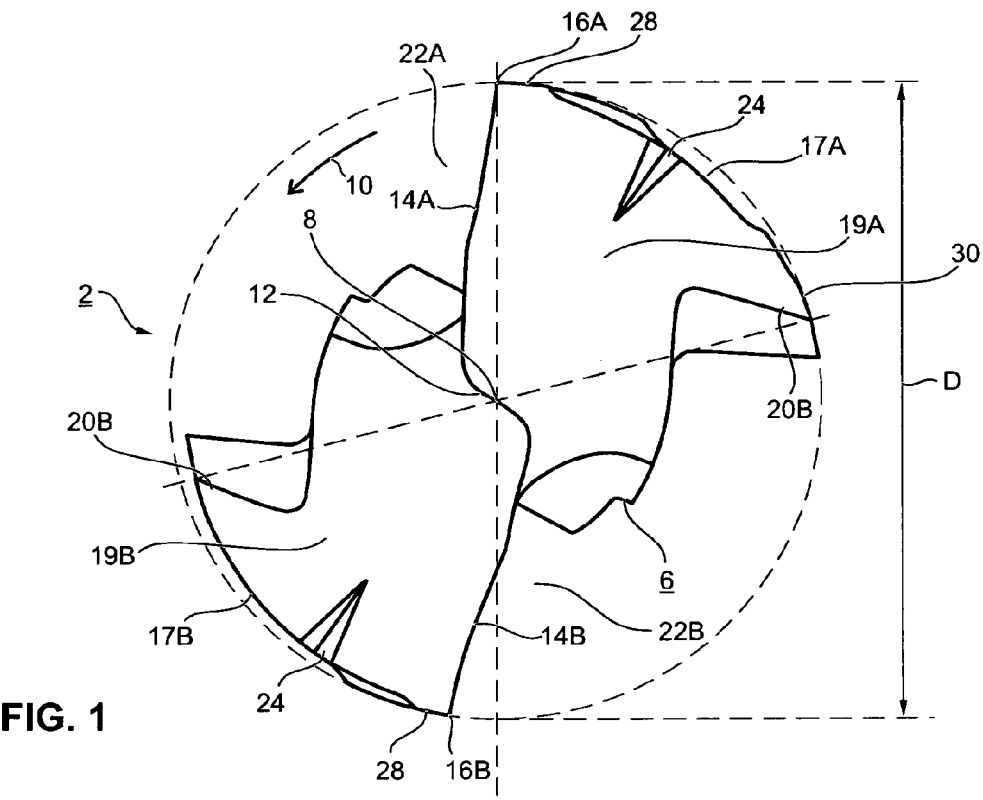
FIG. 1 shows a top view of the front outside face of a drill tip realized as an exchangeable modular part.
Figure 2:
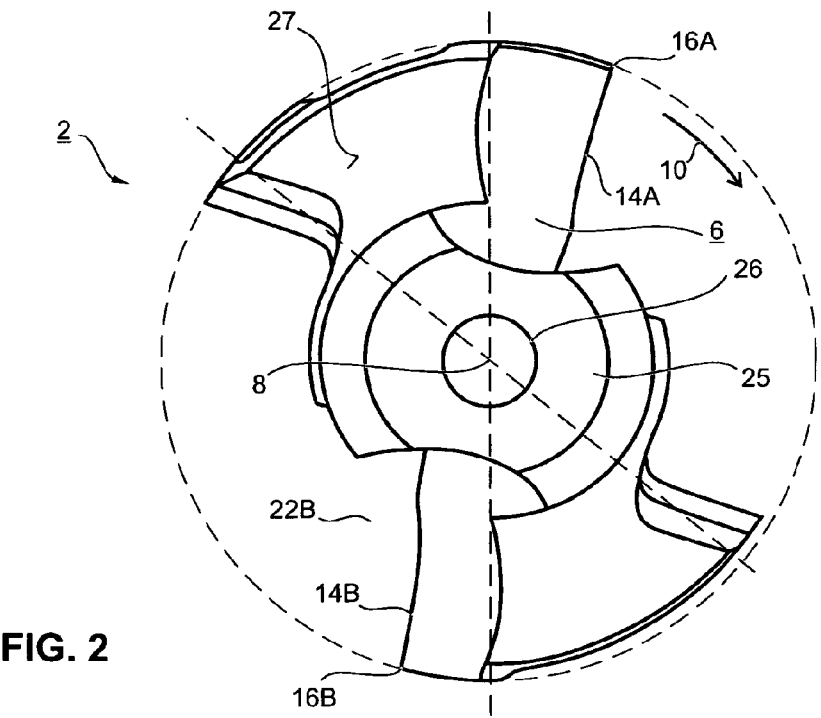
FIG. 2 shows a top view of the back, rear outside end of the drill tip according to FIG. 1.
Figure 3:
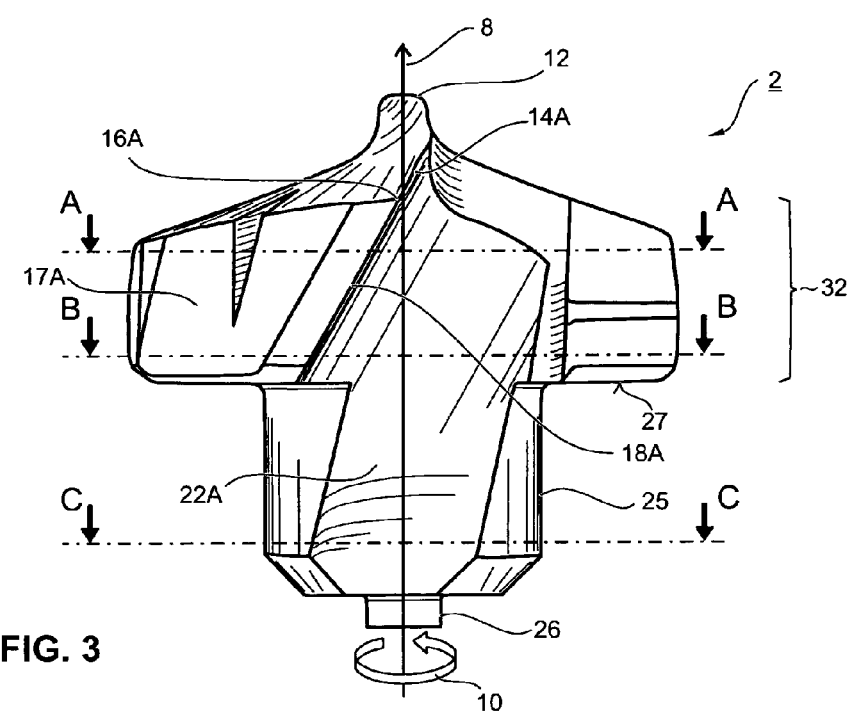
FIG. 3 shows a side view of the drill tip according to FIGS. 1 and 2, FIGS. 4A,B,C show sectional views through the drill tip of FIGS. 1 to 3, according to the section lines A-A, B-B, C-C in FIG. 3.
Figures 4A, 4B, 4C:
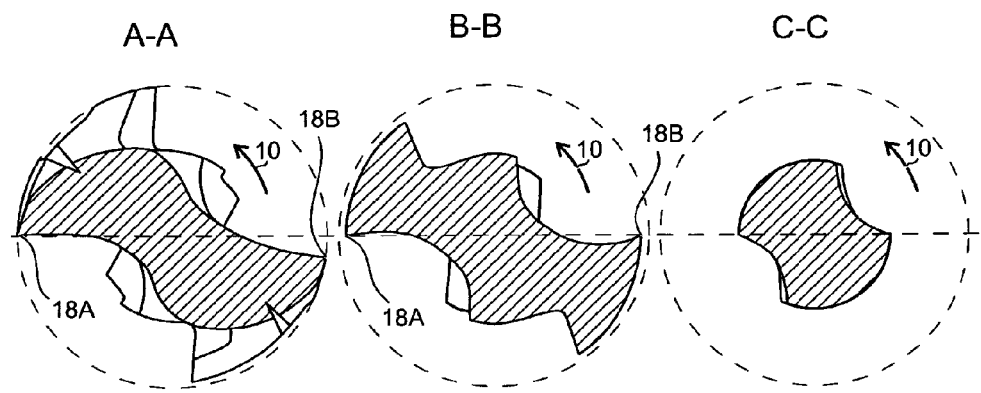
Figure 5:
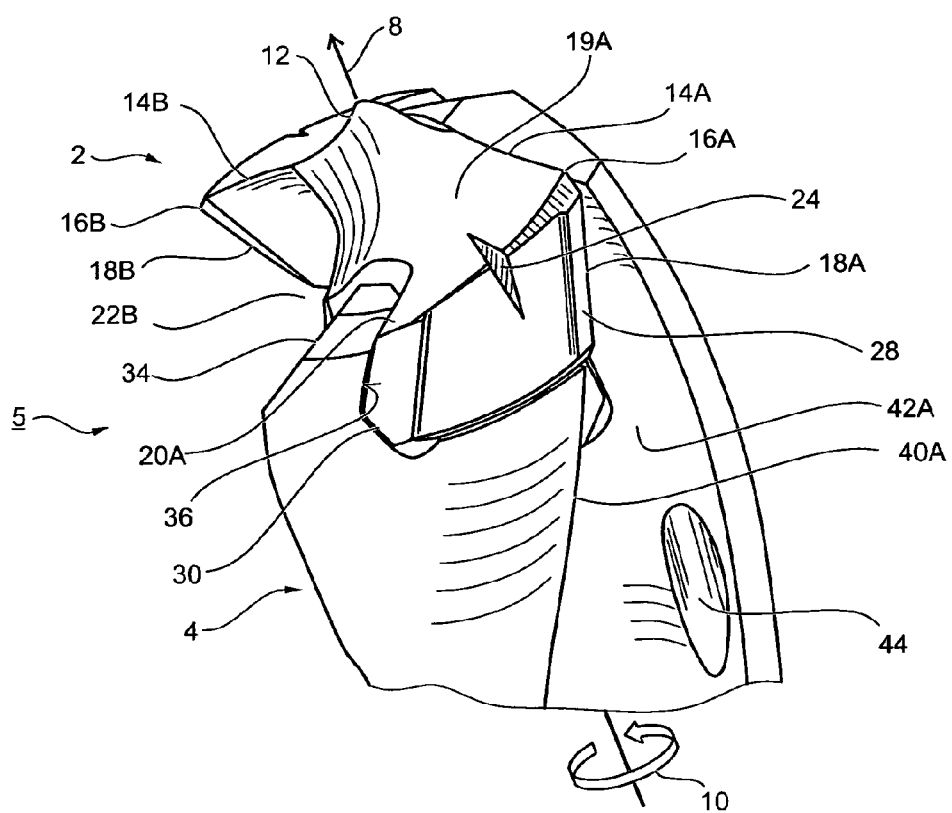
FIG. 5 shows a portionally perspective representation of a modular drilling tool having a drill basic body and having the drill tip according to FIGS. 1 to 3 inserted in the latter, at an outside end.

The drill tip 2 according to FIGS. 1 to 3 is realized as an exchangeable modular part that can be inserted in a drill basic body 4, as represented in FIG. 5, and that, together with the latter, constitutes a drilling tool 5. In the exemplary embodiment, the drill tip 2 is realized as a single piece, and has a specially shaped basic body 6. It is thus constituted by this basic body 6. The drill tip 2 has an axis of rotation 8, which, during operation, is at the same time the rotary axis about which the entire drilling tool 5 rotates in the direction of rotation 10.

At its front outside end, the drill tip 2 has a chisel edge 12, which crosses the axis of rotation 8 and in each case undergoes a transition into a main cutting edge 14A,B, which run outwards in the radial direction and end at a cutting corner 16A,B. Starting from the respective cutting corner 16A,B, a respective secondary cutting edge 18A,B runs along a drill heel 17A,B. In the exemplary embodiment, the chisel edge 12 is realized approximately in an S shape, and the main cutting edges 14A,B also assume a curved course. In addition, the main cutting edges 14A,B incline downwards in the axial direction towards the cutting corner 16A,B, such that the outside face of the drill tip 2 is realized overall in the manner of a cone. Adjoining the main cutting edges 14A,B in each case is a main flank 19A,B, which extends as far as a back end 20A,B, where in each case it then undergoes a transition into a chip flute 22A,B. In the exemplary embodiment, the chip flutes 22A,B are realized in a helical manner. Recessed into the main flanks 19A,B, on the outer periphery, are notches 24 that serve as working surfaces for an assembling tool for inserting the drill tip 2 in or removing it from the drill basic body 4.

At its back end, the drill tip 2 has a stepped geometry, and comprises a fastening pin 25 and, in addition, a centring pin 26 of reduced diameter relative to the fastening pin 25. The chip flutes 22A,B go from a top part, which includes the front outside face, as far as into the fastening pin 25, such that the latter, as viewed in cross-section, is realized in circular form having trough-like recesses constituting the chip flute 22A,B. Realized on the underside of the top part is a bearing surface, designated as a rear outside face 27, which projects radially over the fastening pin 25. In the exemplary embodiment, this rear outside face 27 extends perpendicularly in relation to the axis of rotation 8. By means of this outside face 27, the drill tip 2, when in the mounted state, lies on a corresponding bearing surface of the drill basic body 4, as can be seen from FIG. 5.

The fastening of the drill tip 2 in the drill basic body 4 is effected through a push-on and turn movement. The special configuration of the fastening region and the special configuration of the drill basic body 4 with its outside-end receiving region are given by WO 03/070408 A1, to which reference is hereby made.

Of crucial importance is the special configuration of the drill tip 2, which, in the region of its front outside end, is of an asymmetrical configuration relative to a 180° rotation about the axis of rotation 8, the drill tip 2 at the same time being of a symmetrical configuration further along in the axial direction. For the purpose of better elucidating the asymmetry features, broken auxiliary lines are drawn in FIGS. 1, 2 and 4A to 4C. From these, it can be seen immediately that the two cutting corners 16A,B are disposed with a non-uniform distribution over the periphery, that they therefore differ in their angular distance from one another. Here, for example, the difference in the angular distance is in the range of approximately 20°, i.e. the angular distance between the two cutting corners 16A,B is, on the one hand, approximately 190° and, on the other hand, approximately 170°. As a result of this, at the same time, the chip flutes 22A,B are also realized asymmetrically.

In addition, the drill tip 2 has further asymmetry features. For good concentricity and reliable guidance of the drilling tool 5 in the drill hole, there is provided, on the one hand, a guide land 28, which runs on the drill heel 17A,B, i.e. on the outer periphery of the basic body 6, and which in each case adjoins the respective secondary cutting edge 18A,B. Whereas, on the drill heel 17A, a support land 30 is provided in addition to the guide land 28, this support land is not realized on the drill heel 17B assigned to the second main cutting edge 14B. The support land 30 has the same or virtually the same outer diameter as the guide land 28. During drilling, the drill tip 2 is additionally supported on the wall of the drilled hole by the support land 30. In the case of the second drill heel 17B, by contrast, a clearance is realized instead of the support land 30. As can be seen from FIG. 1, in particular, but also from FIG. 5, such a clearance is also realized between the guide land 28 and the support land 30. This special asymmetrical configuration is described in DE 10 2006 025 294 A1, hereby referred to in its entirety.

As can further be seen from the second auxiliary line drawn in FIG. 1, the back ends 20A,B of the main flanks 19A,B are realized so as to be rotationally symmetrical in relation to one another, in particular at the outer peripheral line, to such an extent that the back ends 20A,B have the same angular distance in relation to one another. The included angle of the two chip flutes 22A,B, i.e. the angular distance between the respective cutting corner 16A,B and the respective assigned back end 20A,B disposed on the outer periphery, differs as a result.

The asymmetry in respect of the position of the cutting corners 16A,B and of the chip flutes 22A,B is restored to a symmetrical configuration in the transition region 32. The transition region 32 is represented in FIG. 3, and extends in the axial direction from the respective cutting corner 16A,B as far as the rear outside face 27. In this case, the length of this transition region 32 is approximately in the range between 20 and 40% of the nominal diameter D of the drill tip 2 (cf. FIG. 1). As can be seen, in particular, from the back view according to FIG. 2 and also from FIG. 4B, a symmetrical configuration is already achieved at the end of the transition region 32.

At this point, the secondary cutting edges 18A,B are already again disposed in a rotationally symmetrical manner (at 180°) in relation to one another. The cross-sectional geometry of the chip flutes 22A,B is also realized symmetrically.

The support land 30, on the other hand—as shown, in particular, by FIG. 5—remains present as far as the rear outside face 27, i.e. as far as the end of the drill tip 2. In the transition region 32, therefore, only some asymmetry features are restored in a continuous manner; in the exemplary embodiment, this is, in particular, the configuration of the chip flutes 22A,B and the angular distance of the secondary cutting edges 18A,B in relation to one another. A complete symmetry is realized at the end of the transition region 32, i.e. beginning with the drill basic body 4. The support land 30 thus undergoes a transition into the drill basic body 4 not in an even manner, but abruptly.

The modular drilling tool 5 is represented in the assembled state in FIG. 5. As can be seen from this, the drill tip 2 is clamped-in between two opposing limbs 34 that extend in the axial direction. The limbs 34 have a bearing surface 36, which is realized with an oblique incline. As can be seen from FIG. 5, the limb 34 engages, as it were, in the respective main flank 19A,B, the drill tip 2 therefore not covering the limbs 34. The outside face of the limbs 34 therefore constitutes a continuation of the main flanks 19A, B. In the case of this special configuration, therefore, it is particularly advantageous that the symmetrical configuration is already present at the outside face of the drill tip 2 in the region of the back end 20A,B of the main flanks 19A,B. The drill basic body 4 is realized so as to be fully rotationally symmetrical.

The secondary cutting edges 18A,B of the drill tip 2 preferably undergo a transition in a flush manner into corresponding secondary cutting edges 40A (only one shown) of the drill basic body 4. The same also applies to the chip flutes 22A,B, which undergo a transition into chip flutes 42A of the drill basic body 4. In the exemplary embodiment, the chip flutes 42A of the drill basic body are realized in a helical manner. Alternatively, they can also be straight.

Furthermore, it can be seen from FIG. 5 that cooling channels 44 are recessed into the drill basic body 4. These cooling channels in this case come out within the respective chip flute 42A of the drill basic body 4, at some distance from the drill tip 2. In this case, the opening of the cooling channel 44 in the respective chip flute 42A is oriented in such a way that—in the case of a notional projection in the axial direction—it is partially covered, in particular half covered, by the assigned main cutting edge 14A,B. The outlet openings of the cooling channels 44 are therefore aligned to these main cutting edges 14A,B.

The drilling tool 5 serves to produce high-precision drill holes with an optimal surface quality of the wall of the drilled hole. Owing to the asymmetry features, drilling is as free of chatter as possible, even in the case of deep drill holes. The drill tip is realized, for example, from hard metal or from sintered material. The drill basic body 4 is made, for example, from a high-speed steel.

The invention claimed is:

1. A drill tip comprising:
   a body provided with chip flutes and extending in the axial direction along an axis of rotation and at the front outside end of which there is provided a chisel edge which crosses the axis of rotation and transitions into at least two main cutting edges that each run outwards in the radial direction to a respective cutting corner disposed at a level with respect to the axis of rotation,
   wherein the body, as viewed in a cross-section, has an asymmetrical configuration at the level of the cutting corners relative to a rotation about the axis of rotation,
   wherein at a distance from the cutting corners in the axial direction, the body has a symmetrical configuration, and
   wherein secondary cutting edges extending in the axial direction begin at the respective cutting corners, and wherein the respective cutting corners are not uniformly distributed around the periphery and, at a distance from the cutting corners in the axial direction, the secondary cutting edges are disposed with a uniform distribution;
   wherein, at the level of the cutting corners:
      the chip flutes are realized asymmetrically in relation to one another; and
      the chip flutes have equal cross-sectional areas.

2. The drill tip as claimed in claim 1, wherein in a transition region from the symmetrical to the asymmetrical configuration, the secondary cutting edges assume different inclinations relative to the axis of rotation.

3. The drill tip as claimed in claim 1, wherein, at a distance from the cutting corners in the axial direction, the chip flutes are realized symmetrically in relation to one another.

4. The drill tip as claimed in claim 3, wherein:
   along the axial direction, and in a transition region, the chip flutes undergo a transition from an asymmetrical configuration at the level of the cutting corners to a symmetrical configuration at the distance from the cutting corners; and
   where the chip flutes are realized asymmetrically in relation to one another in the transition region, the chip flutes have equal cross-sectional areas.

5. The drill tip as claimed in claim 1, wherein adjoining the main cutting edges there are main flanks that each comprise a back end, the back ends having the same angular distance in relation to one another.

6. The drill tip as claimed claim 1, wherein the asymmetrical configuration undergoes a transition into the symmetrical configuration in a continuous and even manner.

7. The drill tip as claimed in claim 1, wherein the drill tip is realized as an exchangeable modular part provided for insertion in a drill body of a modular drilling tool.

8. The drill tip as claimed in claim 7, wherein the drill tip comprises a rear outside face, and the symmetrical configuration is present at the level of the rear outside face.

9. A drilling tool having a drill tip as claimed in claim 1.

10. The drilling tool as claimed in claim 9, wherein the drilling tool comprises a modular drilling tool having a drill body including a receiver therein in which the drill tip can be exchangeably inserted.

11. The drilling tool as claimed in claim 10, wherein the drill body is realized symmetrically in the region of the receiver.

12. A drill tip comprising:
   a body provided with chip flutes and extending in the axial direction along an axis of rotation and at the front outside end of which there is provided a chisel edge which crosses the axis of rotation and transitions into at least two main cutting edges that each run outwards in the radial direction to a respective cutting corner disposed at a level with respect to the axis of rotation,
   wherein the body, as viewed in a cross-section, has an asymmetrical configuration at the level of the cutting corners relative to a rotation about the axis of rotation,
   wherein at a distance from the cutting corners in the axial direction, the body has a symmetrical configuration, and
   wherein, at the level of the cutting corners:
      the chip flutes are realized asymmetrically in relation to one another; and
      the chip flutes have equal cross-sectional areas.

13. The drill tip as claimed in claim 12, wherein, at a distance from the cutting corners in the axial direction, the chip flutes are realized symmetrically in relation to one another.

14. The drill tip as claimed in claim 13, wherein:
   along the axial direction, and in a transition region, the chip flutes undergo a transition from an asymmetrical configuration at the level of the cutting corners to a symmetrical configuration at the distance from the cutting corners; and
   where the chip flutes are realized asymmetrically in relation to one another in the transition region, the chip flutes have equal cross-sectional areas.

15. The drill tip as claimed in claim 12, wherein secondary cutting edges extending in the axial direction begin at the respective cutting corners, and wherein the respective cutting corners are not uniformly distributed around the periphery.

16. The drill tip as claimed in claim 15, wherein, at a distance from the cutting corners in the axial direction, the chip flutes are realized symmetrically in relation to one another.

* * * * *